US009617417B2

(12) United States Patent
Avtomonov et al.

(10) Patent No.: US 9,617,417 B2
(45) Date of Patent: Apr. 11, 2017

(54) IMPACT-MODIFIED POLYCARBONATE COMPOSITIONS HAVING A GOOD COMBINATION OF NATURAL COLOR, HYDROLYTIC STABILITY AND MELT STABILITY

(71) Applicant: Covestro Deutschland AG, Leverkusen (DE)

(72) Inventors: Evgueni Avtomonov, Leverkusen (DE); Andreas Seidel, Dormagen (DE); Thomas Eckel, Dormagen (DE); Herbert Eichenauer, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/799,655

(22) Filed: Jul. 15, 2015

(65) Prior Publication Data
US 2015/0315383 A1   Nov. 5, 2015

Related U.S. Application Data

(63) Continuation of application No. 12/405,498, filed on Mar. 17, 2009, now abandoned.

(30) Foreign Application Priority Data

Mar. 22, 2008 (DE) .................. 10 2008 015 407

(51) Int. Cl.
| *C08L 69/00* | (2006.01) |
| *C08K 5/092* | (2006.01) |
| *C08K 5/098* | (2006.01) |
| *C08K 5/49* | (2006.01) |
| *C08K 5/523* | (2006.01) |
| *C08L 25/12* | (2006.01) |
| *C08L 51/04* | (2006.01) |
| *C08L 55/02* | (2006.01) |
| *C08L 67/02* | (2006.01) |

(52) U.S. Cl.
CPC ............. *C08L 69/00* (2013.01); *C08L 69/005* (2013.01); *C08K 5/092* (2013.01); *C08K 5/098* (2013.01);
(Continued)

(58) Field of Classification Search
CPC ...... C08L 69/00; C08L 69/05; C08L 2205/03; C08L 2205/06; C08L 2201/02;
(Continued)

(56) References Cited

U.S. PATENT DOCUMENTS 3,951,903 A    4/1976 Shaffer
5,393,836 A *  2/1995 Niessner ................. C08L 25/12
                                                  525/146
(Continued)

FOREIGN PATENT DOCUMENTS

DE   9401822   3/2001
EP   0780438   6/1997
(Continued)

OTHER PUBLICATIONS www.dsm.com/en_US/downloads/depXantar_brochure_01.pdf; Technical brochure from DMS published on mentioned internet site.

Primary Examiner — Robert Jones, Jr.
(74) Attorney, Agent, or Firm — K&L Gates LLP

(57) ABSTRACT

The present invention relates to polycarbonate compositions comprising
A) from 10 to 99 parts by weight, in each case based on the sum of components A+B+C, of aromatic polycarbonate and/or aromatic polyester carbonate,
B) from 1 to 35 parts by weight, in each case based on the sum of components A+B+C, of rubber-modified graft polymer of
B.1 from 5 to 95 wt. % of at least one vinyl monomer on
B.2 from 95 to 5 wt. % of one or more graft bases having a glass transition temperature <10° C.,
C) from 0 to 40 parts by weight, in each case based on the sum of components A+B+C, of vinyl (co)polymer and/or polyalkylene terephthalate,
D) from 0 to 50 parts by weight, in each case based on the sum of components A+B+C, of phosphorus-containing flameproofing agent,
E) from 0 to 1.0 part by weight, in each case based on the sum of components A+B+C, of acidic additives, and
F) from 0 to 50 parts by weight, in each case based on the sum of components A+B+C, of additives,
wherein component B is obtainable by reacting component B.1 with the graft base B.2 by means of emulsion polymerization, with the proviso that in those compositions that are free of components D) and E), the graft polymer dispersion in the spray drying or in the precipitation has a pH value of less than 7,
characterized in that there are used in the graft reaction from 0.1 to 5 parts by weight (based on the sum of the parts by weight of the monomers B.1 and of the graft base B.2 that are used=100 parts by weight) of at least one emulsifier selected from the group consisting of alkali, alkaline earth, ammonium and phosphonium salts of a saturated fatty acid having from 10 to 50 carbon atoms, wherein the emulsifier or emulsifiers remains or remain in component B,
and also to a process for the preparation of these polycarbonate compositions and to the use of the polycarbonate compositions in the production of molded bodies, and to the molded bodies themselves.

19 Claims, No Drawings

(52) U.S. Cl.
CPC .............. *C08K 5/49* (2013.01); *C08K 5/523* (2013.01); *C08L 25/12* (2013.01); *C08L 51/04* (2013.01); *C08L 55/02* (2013.01); *C08L 67/02* (2013.01); *C08L 2201/02* (2013.01); *C08L 2205/03* (2013.01); *C08L 2205/06* (2013.01)

(58) Field of Classification Search
CPC .......... C08L 25/12; C08L 55/02; C08L 67/02; C08K 5/092; C08K 5/098; C08K 5/49; C08K 5/523
See application file for complete search history.

(56) References Cited

U.S. PATENT DOCUMENTS

| | | |
|---|---|---|
| 5,969,041 A | 10/1999 | Eichenauer et al. |
| 2002/0115761 A1 | 8/2002 | Eckel et al. |

FOREIGN PATENT DOCUMENTS

| | | |
|---|---|---|
| EP | 0900827 | 3/1999 |
| WO | 9901489 | 1/1999 |
| WO | 0000541 | 1/2000 |

\* cited by examiner

IMPACT-MODIFIED POLYCARBONATE COMPOSITIONS HAVING A GOOD COMBINATION OF NATURAL COLOR, HYDROLYTIC STABILITY AND MELT STABILITY

CROSS REFERENCE TO RELATED APPLICATIONS

This application is a continuation of U.S. application Ser. No. 12/405,498, filed Mar. 17, 2009, which claims priority to DE 10 2008 015 407.5, filed Mar. 22, 2008, the contents of which are incorporated herein by reference in their entirety.

BACKGROUND OF THE INVENTION

The present invention relates to polycarbonate compositions comprising as impact modifier specific rubber-containing graft polymers prepared by the process of emulsion polymerization, and also to a process for the preparation of these polycarbonate compositions and to the use of the polycarbonate composition in the production of molded bodies, and to the molded bodies themselves.

DESCRIPTION OF RELATED ART

Polycarbonate compositions comprising graft polymers as impact modifiers can have varying stability to hydrolysis and thermal stress depending on the purity of and the additives in the impact modifier, for example ABS (acrylonitrile-butadiene-styrene terpolymer). For example, B S. Patty, L. Novak and H. Phan (in "Thermal and hydrolytic stability of polycarbonate/acrylonitrile-butadiene-styrene based blends", Society of Automotive Engineers, [Special Publication] SP (2005), SP-1960 (Advances in Plastic Components, Processes and Technologies), 145-151) describe polycarbonate compositions which have markedly better hydrolytic stability and thermal stability when they contain mass ABS as modifier than when they contain emulsion ABS as modifier. The different behavior of the polycarbonate/mass ABS compositions compared with that of the polycarbonate/emulsion ABS compositions is attributed to the fact that the preparation process for emulsion ABS, as compared with mass ABS, requires a larger number of different chemicals as auxiliary agents, such as, for example, emulsifiers, flow improvers, stabilizers, salts, etc., these chemicals also including ones which can lead to decomposition of the polycarbonate. A further advantage of polycarbonate/mass ABS compositions is their particularly light inherent color (natural color), which has a particularly favorable effect on the dyeing of the molded bodies consisting of such compositions. However, compositions containing mass ABS as impact modifier frequently show greater changes in their melt viscosity at high temperatures (e.g. at 280-300° C.), which are accompanied by impaired processing stability.

Some polycarbonate compositions containing emulsion graft polymers as input modifier exhibit some technical advantages over polycarbonate compositions containing mass ABS, for example in respect of their surface quality (gloss), so that it is advantageous to use emulsion graft polymers for some applications. If high hydrolytic and thermal stability are required, high demands must be made of the emulsion graft polymers that are used, such as, for example, in respect of their purity, the working-up process used in their preparation, and the omission of certain auxiliary substances in their preparation.

For example, EP-A 0 900 827 discloses impact-modified polycarbonate compositions with improved thermal stability which contain emulsion graft polymers and are substantially free of components that degrade the polycarbonate. In order to obtain an emulsion graft polymer that is substantially free of components that degrade the polycarbonate it is necessary to omit such components completely at each stage of the emulsion process or to free the prepared emulsion graft polymers of such components completely by an appropriate working-up process, for example by washing after coagulation of the graft dispersion. In particular, it is necessary to dispense with the use of carboxylate-containing auxiliary substances (e.g. emulsifiers, buffer solutions, etc.) because they degrade polycarbonate. The polycarbonate compositions known from EP-A 0 900 827 contain emulsion graft polymers of the MBS and ABS type which have been prepared using sulfate- and/or sulfonate-containing emulsifiers. These emulsifiers frequently lead to undesirable discoloration of the molding compositions.

Emulsion graft polymers of the ABS type which are prepared by means of a wide variety of emulsifiers are known from WO-A 99/01489. Conventional carboxylate-containing emulsifiers, inter alia, are mentioned as possible emulsifiers for their preparation. This patent specification also teaches how to prepare particularly light colored ABS molding compositions in which the processing and the acrylonitrile content in the graft polymer and in the matrix component (SAN resin) play a particularly important role. WO-A 99/01489 especially discloses that the compositions containing emulsion ABS have a particular tendency to yellowing or even to turning brown. This yellowing or tuning brown is distinguished by a yellowness index of from greater than 30 to far more than 50. The yellowness index is dependent on several factors, inter alia on the rubber and acrylonitrile content of the ABS, on the additives in the emulsion polymerization and in the working up, and optionally on the purification of the graft polymer as well as the processing conditions for the molding compositions and conditions during the production of molded bodies. The yellowing or brown discoloration is promoted by high temperatures, as it happens, for example, in the case of processing by injection molding or in the case of blending with additives during compounding on an extruder.

In a technical brochure from DSM (published on the internet site: www.dsm.com/en_US/downloads/dep/Xantar_brochure_01.pdf), polycarbonate/ABS compositions having the following improved properties are described: for example, a high degree of flowability combined with high strength, improved processability combined with reduced mould coating during injection molding, improved surface quality, more stable surface gloss and, for example, a lighter natural color than is the case with conventional polycarbonate/ABS compositions. In the same brochure it is indicated that a specially developed, highly pure ABS is used in these improved polycarbonate/ABS compositions.

SUMMARY OF THE INVENTION

An object of the present invention was to provide impact-modified polycarbonate molding compositions comprising at least one emulsion graft polymer as an impact modifier. Compositions of the present invention are distinguished, inter alia, by a combination of a light natural color, high hydrolytic stability and excellent processing stability. Compositions of the present invention additionally, advantageously fulfill the condition that they comprise an emulsion graft polymer that is prepared in a preparation process that is efficient and advantageous for the environment.

It has now been found, surprisingly, that the desired property profile can be exhibited by compositions comprising A) from 10 to 99 parts by weight, preferably from 40 to 95 parts by weight, particularly preferably from 50 to 73 parts by weight, in each case based on the sum of components A+B+C, of aromatic polycarbonate and/or aromatic polyester carbonate, B) from 1 to 35 parts by weight, preferably from 4 to 30 parts by weight, particularly preferably from 12 to 20 parts by weight, in each case based on the sum of components A+B+C, of rubber-modified graft polymer of B.1 from 5 to 95 wt. %, preferably from 30 to 90 wt. %, of at least one vinyl monomer on B.2 from 95 to 5 wt %, preferably from 70 to 10 wt. %, of one or more graft bases having a glass transition temperature <10° C., preferably <0° C., particularly preferably <−20° C., C) from 0 to 40 parts by weight, preferably from 1 to 30 parts by weight, particularly preferably from 15 to 25 parts by weight, in each case based on the sum of components A+B+C, of vinyl (co)polymer and/or polyalkylene terephthalate, D) from 0 to 50 parts by weight, preferably from 1 to 40 parts by weight, particularly preferably from 2 to 30 parts by weight, in each case based on the sum of components A+B+C, of phosphorus-containing flameproofing agent, E) from 0 to 1.0 part by weight, preferably from 0.01 to 1.0 part by weight, particularly preferably from 0.02 to 0.5 part by weight, in each case based on the sum of components A+B+C, of acidic additives, and F) from 0 to 50 parts by weight, preferably from 0.5 to 25 parts by weight, in each case based on the sum of components A+B+C, of additives, wherein component B is obtainable by reacting component B.1 with the graft base B.2 by means of emulsion polymerization, with the proviso that in those compositions that are free of components D) and E) the graft polymer dispersion of the component B) in the spray drying step or in the precipitation step has a pH value of less than 7, and, moreover, are characterized in that they advantageously comprise from 0.1 to 5 parts by weight, more preferably from 0.3 to 2.5 parts by weight, even more favorably 0.5 to 2.5 parts by weight, in particular 1.0 to 2.5 parts by weight, particularly preferably from 1.5 to 2.5 parts by weight (based on the sum of the parts by weight of the monomers B.1 and of the graft base B.2 that together equal to 100 parts by weight) of at least one emulsifier selected from the group consisting of alkali, alkaline earth, ammonium and phosphonium salts of a saturated fatty acid having from 10 to 50 carbon atoms, wherein the emulsifier or emulsifiers remains or remain in component B, and, furthermore, all parts by weight in the present application are so standardized that the sum of the parts by weight of all components A+B+C in the composition is 100.

Additional objects, features and advantages of the invention will be set forth in the description which follows, and in part, will be obvious from the description, or may be learned by practice of the invention. The objects, features and advantages of the invention may be realized and obtained by means of the instrumentalities and combinations particularly pointed out in the appended claims.

DETAILED DESCRIPTION OF A PREFERRED EMBODIMENT

The above-described molding compositions according to the invention accordingly differ from the prior art, inter alia, and in particular in that, that in the preparation of component B, the step of the purification of the emulsion graft polymer (e.g. by washing the coagulated graft polymer with up to 100-fold amount of water) can preferably be omitted, so that the preparation process for the emulsion graft polymer (component B) is efficient and advantageous for the environment. It has been found, surprisingly, that, even though the emulsifier remains in the resulting graft polymer, the impact-modified polycarbonate compositions according to the invention containing that graft polymer have a good natural color, high hydrolytic stability and excellent processing stability.

Accordingly, the present invention overcomes the technical disadvantage of the above-mentioned prior art that highly pure impact modifiers generally should be used to produce impact-modified polycarbonate molding compositions having improved properties, and that it must be ensured, in particular, that the compositions are free of carboxylate-containing auxiliary substances. This is not necessarily required in connection with the present invention. That is, it is not necessarily required to utilize highly purified impact modifiers and in addition, it is not necessary that all compositions must be free of carboxylate-containing auxiliaries.

The present invention also provides a process for the preparation of impact-modified polycarbonate molding compositions which have an improved natural color along with the good hydrolytic stability and processing stability of the impact-modified polycarbonate molding wherein the constituents A) from 10 to 99 parts by weight, preferably from 40 to 95 parts by weight, particularly preferably from 50 to 73 parts by weight, of aromatic polycarbonate and/or aromatic polyester carbonate, B) from 4 to 350 parts by weight preferably from 4 to 30 parts by weight, particularly preferably from 12 to 20 parts by weight, of rubber-modified graft polymer of B.1 from 5 to 95 wt. %, preferably from 30 to 90 wt. %, of at least one vinyl monomer on B.2 from 95 to 5 wt. %, preferably from 70 to 10 wt. %, of one or more graft bases having a glass transition temperature <10° C., preferably <0° C., particularly preferably <−20° C., C) from 0 to 40 parts by weight, preferably from 1 to 30 parts by weight, particularly preferably from 15 to 25 parts by weight, of vinyl (co)polymer and/or polyalkylene terephthalate, D) from 0 to 50 parts by weight, preferably from 1 to 40 parts by weight, particularly preferably from 2 to 30 parts by weight, in each case based on the sum of components A+B+C, of phosphorus-containing flameproofing agent, E) from 0 to 1.0 part by weight, preferably from 0.01 to 1.0 part by weight, particularly preferably from 0.02 to 0.5 part by weight, in each case based on the sum of components A+B+C, of acidic additives, and F) from 0 to 50 parts by weight, preferably from 0.5 to 25 parts by weight, in each case based on the sum of components A+B+C, of additives, are mixed in a known manner (either in succession or simultaneously, either at preferably about 20° C. (room temperature) or at a higher temperature) and are melt-compounded and melt-extruded advantageously at temperatures of from 260° C. to 300° C. in conventional devices such as internal kneaders, extruders and twin-shaft screws, characterized in that there is used as impact modifier rubber-modified graft polymer (component B), which is prepared by reacting component B.1 with the graft base B.2 by means of emulsion polymerization, wherein (i) in the first step, the rubber base B.2 is prepared directly in the form of an aqueous dispersion by means of radical emulsion polymerization or is dispersed in water, (ii) in the second step, the reaction of component B.1 with the graft base B.2 (referred to hereinbelow as the "graft reaction") is carried out by means of emulsion polymerization, wherein 1) component B.2 is dispersed in water,
2) from 0.1 to 5 parts by weight, preferably from 0.3 to 2.5 parts by weight, even more favorably 0.5 to 2.5 parts by weight, in particular 1.0 to 2.5 parts by weight, particularly preferably from 1.5 to 2.5 parts by weight (based on the sum of the parts by weight of the monomers B.1 and of the graft base B.2 that are used in the preparation of the graft polymer B=100 parts by weight) of at least one emulsifier selected from the group consisting of alkaline, alkaline earth, ammonium and phosphonium salts of a saturated fatty acid having from 10 to 50 carbon atoms, as well as the monomers according to component B.1 and radical formers, as well as, optionally, molecular weight regulators for the rubber base dispersion obtained in step (1) are added,
3) working up is carried out by means of
   3.1) spray drying or
   3.2) by means of a process comprising the steps
      3.2.1) precipitation and
      3.22) separation of the dispersing water,
   with the proviso that, in those compositions that are free of components D) and E), the graft polymer dispersion in the spray drying (3.1) or in the precipitation (3.2.1) has a pH value of less than 7,
characterized in that the resulting moist graft polymer is not washed with additional water,
and wherein all parts by weight in the present application are so standardized that the sum of the parts by weight of all components A+B+C in the composition is 100.

Component A

Aromatic polycarbonates and/or aromatic polyester carbonates that are suitable according to the invention as component A are known in the literature or can be prepared by processes known in the literature (for the preparation of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934).

The preparation of aromatic polycarbonates is carried out, for example, by reaction of diphenols with carbonoic acid halides, preferably phosgene, and/or with aromatic dicarboxylic acid dihalides, preferably beanzenedicarboxylic acid dihalides, by the interfacial process, optionally using chain terminators, for example monophenols, and optionally using branching agents having a functionality of three or more, for example triphenols or tetraphenols. Preparation by a melt polymerization process by reaction of diphenols with, for example, diphenyl carbonate is also possible.

Diphenols for the preparation of the aromatic polycarbonates and/or aromatic polyester carbonates are preferably those of formula (I)

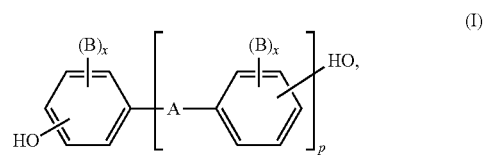

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there can be fused further aromatic rings optionally containing heteroatoms,
or a radical of formula (II) or (III)

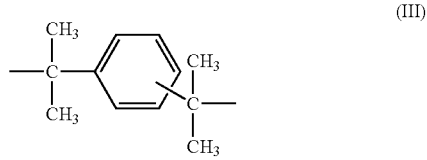

B in each case represents $C_1$- to $C_{12}$-alkyl, preferably methyl, halogen, preferably chlorine and/or bromine,
x in each case independently of the other represents 0, 1 or 2,
p is 1 or 0, and
$R^5$ and $R^6$ can be chosen individually for each $X^1$ and represent, independently of one another, hydrogen or $C_1$- to $C_6$-alkyl, preferably hydrogen, methyl or ethyl,
$X^1$ represents carbon and
m represents an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxy-phenyl)-diisopropylbenzenes and derivatives thereof brominated and/or chlorinated on the ring.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxy-diphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane, 2,2-Bis-(4-hydroxyphenyl)-propane (bisphenol A) is particularly preferred.

The diphenols can be used on their own or in the form of any desired mixtures. The diphenols are known in the literature or obtainable by processes known in the literature.

Suitable chain terminators for the preparation of the thermoplastic, aromatic polycarbonates are, for example, phenol, p-chlorophenol, p-tert-butylphenol or 2,4,6-tribromophenol, and also long-chained alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % mol % to 10 mol % mol %, based on the molar sum of the diphenols used in a particular case.

The thermoplastic, aromatic polycarbonates have mean weight-average molecular weights ($M_w$, measured, for example, by GPC, ultracentrifugation or scattered light measurement) of from 10,000 to 200,000 g/mol, preferably from 15,000 to 80,000 g/mol, particularly preferably from 24,000 to 32,000 g/mol.

The thermoplastic, aromatic polycarbonates can be branched in a known manner, preferably by incorporating from 0.05 to 2.0 mol %, based on the sum of the diphenols used, of compounds having a functionality of three or more, for example those having three or more phenolic groups.

Both homopolycarbonates and copolycarbonates are suitable. For the preparation of copolycarbonates according to the invention as component A it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared by processes known in the literature. The preparation of polydiorganosiloxane-containing copolycarbonates is described in DE-A 3 334 782.

Preferred polycarbonates, in addition to the homopolycarbonates of bisphenol A, are the copolycarbonates of bisphenol A with up to 15 mol %, based an the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of the aromatic polyester carbonates also the chlorocarbonic acid esters of the mentioned monophenols as well as the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein.

The aromatic polyester carbonates can be both linear and branched in known manner (see in this connection DE-A 2 940 024 and DE-A 3 007 934).

As branching agents there can be used, for example, carboxylic acid chlorides having a functionality of three or more, such as trimesic acid trichloride, cyanuric acid trichloride, 3,3'-4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be used initially with the diphenols, acid chloride branching agents can be introduced together with the acid dichlorides.

The amount of carbonate structural units in the thermoplastic, aromatic polyester carbonates can vary as desired. The amount of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or randomly distributed.

The relative solution viscosity ($\eta_{rel}$) of the aromatic polycarbonates and polyester carbonates is in the range from 1.18 to 1.4, preferably from 1.20 to 1.32 (measured on solutions of 0.5 g of polycarbonate or polyester carbonate in 100 ml of methylene chloride solution at 25° C.).

The thermoplastic, aromatic polycarbonates and polyester carbonates can be used on their own or in any desired mixture.

Component B

Component B comprises one or more graft polymers of
B.1 from 5 to 95 wt. %, preferably from 30 to 90 wt. %, of at least one vinyl monomer on
B.2 from 95 to 5 wt. %, preferably from 70 to 10 wt. %, of one or more graft bases having a glass transition temperature <10° C., preferably <0° C., particularly preferably <−20° C., characterized in that the reaction of component B.1 (also referred to hereinbelow as the grafting shell) with the graft base B.2 is carried out by means of emulsion polymerization ("graft reaction"), wherein an emulsifier selected from the group consisting of alkali, alkaline earth, ammonium and phosphonium salts of a saturated fatty acid having from 10 to 50 carbon atoms is used.

The graft base B.2 generally has a mean particle size ($d_{50}$ value) of from 0.05 to 10 μm, preferably from 0.1 to 5 μm, particularly preferably from 0.2 to 0.8 μm.

Monomers B.1 are preferably mixtures of
B.1.1 from 50 to 99 parts by weight vinyl aromatic compounds and/or vinyl aromatic compounds substituted in the ring (such as styrene, r-methylstyrene, p-methylstyrene, p-chlorostyrene) and/or (meth)acrylic acid ($C_1$-$C_8$)-alkyl esters (such as methyl methacrylate, ethyl methacrylate) and B.1.2 from 1 to 50 parts by weight vinyl cyanides (unsaturated nitriles such as acrylonitrile and methacrylonitrile) and/or (meth)acrylic acid ($C_1$-$C_8$)-alkyl esters, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate. Particularly preferred monomers are B.1.1 styrene and B.1.2 acrylonitrile.

Graft bases B.2 suitable for the graft polymers B are, for example, diene rubbers, EP(D)M rubbers, that is to say those based on ethylene/propylene and optionally a diene, acrylate, polyurethane, silicone, chloroprene and ethylene/vinyl acetate rubbers.

Preferred graft bases B.2 are diene rubbers, for example based on butadiene and isoprene, or mixtures of diene rubbers or copolymers of diene rubbers or mixtures thereof with further copolymerizable monomers (e.g. according to B.1.1 and B.1.2), with the proviso that the glass transition temperature of component B.2 is below <10° C., preferably <0° C., particularly preferably <−10° C. Pure polybutadiene rubber is particularly preferred.

The gel content of the graft base B.2 is at least 30 wt. %, preferably at least 40 wt. % (measured in toluene at 25° C.).

The graft base B.2 is prepared by polymerization, for example by emulsion, suspension, solution or mass polymerization, preferably by emulsion polymerization.

Because it is known that the graft monomers are not necessarily grafted onto the graft base completely in the graft reaction, graft polymers B according to the invention are also to be understood as being products that are obtained by (co)polymerization of the graft monomers in the presence of the graft base and that are obtained concomitantly during working up.

Suitable acrylate rubbers according to B.2 for the polymers B are preferably polymers of acrylic acid alkyl esters, optionally with up to 40 wt. %, based on B.2, of other polymerizable, ethylenically unsaturated monomers. The preferred polymerizable acrylic acid esters include $C_1$- to $C_8$-alkyl esters, for example methyl, ethyl, butyl, n-octyl and 2-ethylhexyl ester; haloalkyl esters, preferably halo-$C_1$-$C_8$-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol di(meth)acrylate, trimethylolpropane tri(meth)acrylate, allyl(meth)acrylate; polyunsaturated heterocyclic compounds, such as trivinyl and triallyl cyanurate; polyfunctional vinyl compounds, such as di- and tri-vinylbezenes; but also triallyl phosphate and diallyl phthalate. Preferred crosslinking monomers are allyl(meth)acrylate, ethylene glycol di(meth)acrylate, trimethylolpropane tri(meth)acrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, trivinylbenzene. The crosslinking monomers can be used individually but also in mixtures. The amount of crosslinking monomers is preferably from 0.02 to 5 wt. %, in particular from 0.05 to 2 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerizable, ethylenically unsaturated monomers which can optionally be used, in addition to the acrylic acid esters, in the preparation of the graft base B.2 are, for example, acrylonitrile, styrene, α-methylstyrene, (meth)acrylamides, vinyl $C_1$-$C_6$-alkyl ethers, methyl methacrylate, butadiene. Preferred acrylate rubbers as graft base B.2 are emulsion polymers having a gel content of at least 40 wt. % (measured in toluene at 25° C.).

Further suitable graft bases according to B.2 are silicone rubbers having graft-active sites, as are described in DE-OS 3 704 657, DE-OS 3 704 655, DE-OS 3 631 540 and DE-OS 3 631 539.

The gel content of the graft base B.2 is determined at 25° C. in a suitable solvent (e.g. toluene) (M. Hoffmann, H Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782-796).

Component B is obtainable by the following process:

1st Step: Preparation of the Rubber Base B.2

It is known to the person skilled in the art, from the prior art, that the graft base B.2 can be prepared by the process of emulsion polymerization. The polymerization is conventionally carried out at from 20° C. to 100° C., preferably from 30° C. to 80° C. Conventional anionic emulsifiers are generally used, for example alkali metal salts of alkyl- or alkylaryl-sulfonic acids, alkyl sulfates, fatty alcohol sulfonates, salts of higher carboxylic acids having from 10 to 50 carbon atoms, sulfosuccinates, ether sulfonates or resinates. The alkali metal salts, in particular the Na and K salts, of alkyl sulfates, alkyl sulfonates, sulfosuccinates, fatty acids or carboxylic acids having from 10 to 30 carbon atoms are conventionally taken.

In the present invention, the choice of emulsifier for the preparation of the rubber base (component B.2) is dependent on the criteria known to the person skilled in the art, such as, for example, the latex shear stability and the properties of the latex particles, particle size, particle size distribution, viscosity, residual monomer content, gel content, and accordingly, contrary to the teaching of EP-A 0 900 827, is not dependent on the exclusion of components that decompose the polycarbonate. According to the present invention, component B.2 is prepared using ionic emulsifiers, preferably alkali metal salts of alkyl- or alkylaryl-sulfonic acids, alkyl sulfates, fatty alcohol sulfonates, salts of higher carboxylic acids having from 10 to 50 carbon atoms, sulfosuccinates, ether sulfonates or resinates, particularly preferably alkali metal salts of resin acids, alkali metal salts of higher fatty acids having from 10 to 30 carbon atoms, alkali metal salts of specific dicarboxylic acids (as described, for example, in DE 3 639 904 A1), or mixtures of ionic and non-ionic emulsifiers, in a manner known to the person skilled in the art. In general, from 0.1 to 10 parts by weight, preferably from 0.2 to 5 parts by weight, particularly preferably from 0.3 to 2.5 parts by weight, of emulsifier are used, based on the sum of the parts by weight of the monomers used for the preparation of the rubber base.

2nd Step: Graft Reaction to Prepare Component B from Components B.1 and B.2

The choice of emulsifier in the graft reaction is critical for the preparation of the emulsion graft polymer B used for the polycarbonate compositions according to the invention. It has been found, surprisingly, that not all conventional emulsifiers as are described, for example, in WO 99/01489 A1 for the preparation of graft polymers for specific light ABS molding compositions can be used in the graft reaction. In order to achieve the object according to the invention only at least one emulsifier selected from the group consisting of alkali, alkaline earth, ammonium and phosphonium salts of a saturated fatty acid having from 10 to 50 carbon atoms is to be used in the graft reaction. Of course, these emulsifiers can be used from the outset in the preparation of the graft base (see 1st step above), so that it may optionally be possible to omit their addition at the graft polymerization stage.

In a preferred embodiment for the preparation of component B of the polycarbonate compositions according to the invention, there is used as emulsifier in the graft reaction at least one alkali metal salt of a saturated monocarboxylic fatty acid having from 10 to 30 carbon atoms, particular preference being given to alkali metal salts of the following acids: capric acid ($C_9H_{19}COOH$), lauric acid ($C_{11}H_{23}COOH$), myristic acid ($C_{13}H_{27}COOH$), palmitic acid ($C_{19}H_{31}COOH$), margaric acid ($C_{16}H_{33}COOH$), stearic acid ($C_{17}H_{35}COOH$), arachic acid ($C_{19}H_{39}COOH$), behenic acid ($C_{21}H_{43}COOH$), lignoceric acid ($C_{23}H_{47}COOH$) or cerotic acid ($C_{25}H_{51}COOH$). The mentioned emulsifiers can also be used in the form of a mixture. In a highly preferred embodiment, sodium or potassium salts of saturated monocarboxylic fatty acids having from 12 to 18 carbon atoms are used in the graft reaction, preferably $C_{17}H_{35}COONa$ or $C_{17}H_{35}COOK$.

The mentioned emulsifiers can be used either individually or in the form of mixtures with one another as well as in combination with other non-ionic emulsifiers known to the person skilled in the art for the purpose of better stabilization of the dispersion.

The emulsifiers for the graft reaction are used in amounts of from 0.1 to 5 parts by weight, preferably from 0.3 to 2.5 parts by weight, even more favorably 0.5 to 2.5 parts by weight, in particular 1.0 to 2.5 parts by weight, particularly preferably from 1.5 to 2.5 parts by weight, based on the sum of the parts by weight of the monomers B.1 and graft base B.2 used in the preparation of the graft polymer B.

Suitable radical formers (also referred to hereinbelow as polymerization initiators) for starting the polymerization reaction are all radical formers that decompose at the chosen reaction temperature, that is to say both those which decompose solely thermally and those which do so in the presence of a redox system, and preference is given as radical formers to peroxides, preferably peroxosulfates (for example sodium or potassium peroxodisulfate) or redox systems, in particular those based on hydroperoxides such as cumene hydroperoxide or tert-butyl hydroperoxide. In general, the polymerization initiators are used in an amount of from 0.05 to 1 wt. %, based on the graft support monomers (B.1).

It is also possible to use molecular weight regulators, such as, for example, ethylhexyl thioglycolate, n- or tert-dodecylmercaptan and/or other mercaptans, terpinols and/or dimeric α-methylstyrene and/or other compounds suitable for adjusting the molecular weight.

In the first step of the graft reaction, component B.2 is dispersed in water, if component B.2 is not present in the form of an aqueous dispersion after the preparation, or is diluted with water. The amount of water used to prepare the graft polymer dispersion is preferably such that the resulting dispersion has a solids content of from 20 to 50 wt. % when the graft reaction is complete.

In the second step, the radical formers, emulsifiers and, optionally, molecular weight regulators are added to the graft polymer dispersion. These auxiliary substances (i.e. radical formers, emulsifiers and molecular weight regulators) can be added discontinuously as a total amount at the beginning of the reaction or can be divided into a plurality of portions and added in portions at the beginning and at one or more subsequent stages, or can be added continuously over a particular period of time. The continuous addition of the auxiliary substances can also be carried out along a gradient (in dependence on time), which can be, for example, increasing or decreasing, linear or exponential, or stepwise.

If molecular weight regulators are used in the polymerization, they can be added in the manner described above in the preparation of the graft base B.2 or in the preparation of the graft support B.1 or both in the preparation of the graft base B.2 and of the graft base B.1, for example discontinuously as a total amount at the beginning of the reaction, or divided into a plurality of portions and added in portions at the beginning and at one or more subsequent stages, or continuously over a specific period of time. The continuous addition of the auxiliary substances can also be carried out along a gradient, which can be, for example, increasing or decreasing, linear or exponential, or stepwise.

In order to maintain a constant pH value, which is preferably from 3 to 11, buffer substances such as $Na_2HPO_4$/$NaH_2PO_4$, sodium hydrogen carbonate or simple acids, such as, for example, acetic acid, or lyes, such as, for example, NaOH, OH, can be used concomitantly.

3rd Step: Working Up

Working up is carried out by means of spray drying or by means of precipitation and separation of the dispersing water.

3.1) Working Up by Means of Spray Drying

In the case of spray drying, the dispersion is converted into fine drops distributed in the air or inert gas, without being made to coagulate beforehand, and is then dried in a counter-stream of air or inert gas to give a powder. Consequently, 100% of all the auxiliary substances remain in the end product.

3.2) Working Up by Means of Precipitation and Separation of the Dispersing Water Working up of the dispersion of the emulsion graft polymer B obtained in the graft reaction step is carried out by a process known to the person skilled in the art without particular demands being made in terms of the purity of the worked-up graft polymer.

3.2.1) Precipitation

The graft polymer B is, for example, first precipitated from the dispersion, for example by addition of salt solutions (for example calcium chloride, magnesium sulfate, alum) or acids (for example acetic acid, hydrochloric acid, phosphoric acid or sulfuric acid) having a precipitating action or alternatively by freezing (freeze coagulation) or by coagulation by means of high shear forces (so-called shear precipitation), the high shear forces being produced, for example, by rotor/stator systems or by pressing the dispersion through a narrow gap. In a preferred form, the graft polymer B is precipitated from the dispersion by addition of magnesium sulfate, particularly preferably by addition of magnesium sulfate/acetic acid solution, as agent having a precipitating action.

3.2.2) Separation of the Dispersing Water

The resulting aqueous phase is separated off in the conventional manner, for example by sieving, filtration, decantation or centrifugation. After separating off the dispersing water, a moist graft polymer is obtained, which usually has a residual water content of up to 60 wt. %.

Unlike the prior art, the moist graft polymer according to the invention is not washed with water. By the process according to the invention there is no or only partial separation of the auxiliary substances, such as, for example, emulsifiers, decomposition products of the radical formers, buffer substances, so that a considerable portion of up to 100% of the auxiliary substances remains in the graft polymer and consequently in the end product, that is to say the moist graft polymer.

The pH value in the working up of the graft polymer dispersion in the step of spray drying (3.1) or precipitation (3.2.1) can be adjusted by processes known to the person skilled in the art, for example by addition of buffer solutions or mineral acids, preferably by addition of one or more acids selected from the group consisting of sulfuric acid, phosphoric acid, nitric acid and $C_1$- to $C_8$-carboxylic acids (e.g. acetic acid). Whether the composition according to the invention must contain acidic additives according to component E depends on the pH value during the working up of the graft polymer dispersion in the step of spray drying or precipitation:

a) If the precipitation or spray drying takes place in an acidic medium (i.e. pH<7), the composition according to the invention can contain phosphorus-containing flameproofing agents according to component D and/or acidic additives according to component E.
b) If the precipitation or spray drying takes place at a neutral pH value or under basic conditions (i.e. pH≥7), the composition according to the invention must contain phosphorus-containing flameproofing agents according to component D and/or acidic additives according to component E.

Component C

Component C comprises one or more thermoplastic vinyl (co)polymers C.1 and/or polyalkylene terephthalates C.2.

Suitable as vinyl (co)polymers C.1 are polymers of at least one monomer from the group of the vinyl aromatic compounds, vinyl cyanides (unsaturated nitriles), (meth) acrylic acid ($C_1$-$C_8$)-alkyl esters, unsaturated carboxylic acids and also derivatives (such as anhydrides and imides) of unsaturated carboxylic acids. Particularly suitable are (co) polymers of C.1.1 from 50 to 99 parts by weight, preferably from 60 to 80 parts by weight, of vinyl aromatic compounds and/or vinyl aromatic compounds substituted on the ring, such as styrene, α-methylstyrene, p-methylstyrene, p-chlorostyrene and/or (meth)acrylic acid ($C_1$-$C_8$)-alkyl esters, such as methyl methacrylate, ethyl methacrylate, and
C.1.2 from 1 to 50 parts by weight, preferably from 20 to 40 parts by weight, of vinyl cyanides (unsaturated nitriles), such as acrylonitrile and methacrylonitrile, and/or (meth) acrylic acid ($C_1$-$C_8$)-alkyl asters, such as methyl methacrylate, n-butyl acrylate, tert-butyl acrylate, and/or unsaturated carboxylic acids, such as maleic acid, and/or derivatives (such as anhydrides and imides) of unsaturated carboxylic acids, for example maleic anhydride and N-phenylmaleimide.

The vinyl (co)polymers C.1 are resin-like, thermoplastic and rubber-free. The copolymer of C.1.1 styrene and C.1.2 acrylonitrile is particularly preferred.

The (co)polymers according to C.1 are known and can be prepared by radical polymerization, in particular by emulsion, suspension, solution or mass polymerization. The (co)polymers preferably have mean molecular weights Mw (weight average, determined by light scattering or sedimentation) of from 15,000 to 200,000.

The polyalkylene terephthalates of component C.2 are reaction products of aromatic dicarboxylic acids or reactive derivatives thereof, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of ethylene glycol and/or 1,4-butanediol radicals.

The preferred polyalkylene terephthalates can contain, in addition to terephthalic acid radicals, up to 20 mol %, preferably up to 10 mol %, of radicals of other aromatic or cycloaliphatic dicarboxylic acids having from 8 to 14 carbon atoms or aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can contain, in addition to ethylene glycol or 1,4-butanediol radicals, up to 20 mol %, preferably up to 10 mol %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxy-propoxyphenyl)-propane (DE-A 2 407 674, 2 407 776, 2 715 932).

The polyalkylene terephthalates can be branched by the incorporation of relatively small amounts of tri- or tetrahydric alcohols or tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propano and pentaerythritol.

Particular preference is given to polyalkylene terephthalates which have bean prepared solely from terephthalic acid and reactive derivatives thereof (e.g. dialkyl esters thereof) and ethylene glycol and/or 1,4-butanediol, and mixtures of these polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, Volume VII, p. 695 ff, Carl-Hanser-Verlag, Munich 1973).

Component D

Phosphorus-containing flameproofing agents (component D) within the scope of the invention are preferably selected from the groups of the monomeric and oligomeric phosphoric and phosphonic acid esters, phosphonate amines and phosphazenes, it also being possible to use as flameproofing agents mixtures of several components selected from one or various of these groups. Halogen-free phosphorus compounds not mentioned specifically here can also be used on their own or in any desired combination with other halogen-free phosphorus compounds.

Preferred monomeric and oligomeric phosphoric or phosphonic acid esters are phosphorus compounds of the general formula (IV)

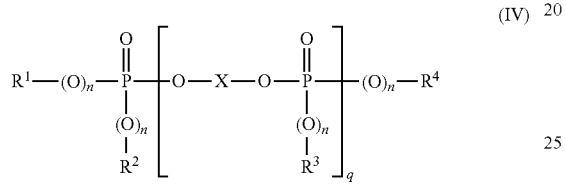

wherein
$R^1$, $R^2$, $R^3$ and $R^4$, independently of one another, represent in each case optionally halogenated $C_1$- to $C_8$-alkyl, or $C_5$- to $C_6$-cycloalkyl, $C_6$-$C_{20}$-aryl or $C_7$-$C_{12}$-aralkyl, in each case optionally substituted by alkyl, preferably $C_1$- to $C_4$-alkyl, and/or halogen, preferably chlorine, bromine,
each of the substituents n independently of the other represents 0 or 1,
q represents from 0 to 30 and
X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

$R^1$, $R^2$, $R^3$ and $R^4$, independently of one another, preferably represent $C_1$- to $C_4$-alkyl, phenyl, naphthyl or phenyl-$C_1$-$C_4$-alkyl. The aromatic groups $R^1$, $R^2$, $R^3$ and $R^4$ can in turn be substituted by halogen and/or alkyl groups, preferably chlorine, bromine and/or $C_1$- to $C_4$-alkyl. Particularly preferred aryl radicals are cresyl, phenyl, xylenyl, propylphenyl or butylphenyl and the corresponding brominated and chlorinated derivatives thereof X in formula (IV) preferably represents a mono- or polynuclear aromatic radical having from 6 to 30 carbon atoms. This radical is preferably derived from diphenols of formula (I).

The substituents n in formula (I), independently of one another, can be 0 or 1; n is preferably 1.

q represents values from 0 to 30, preferably from 0.3 to 20, particularly preferably from 0.5 to 10, especially from 0.5 to 6, most particularly preferably from 1.0 to 1.6.

X particularly preferably represents

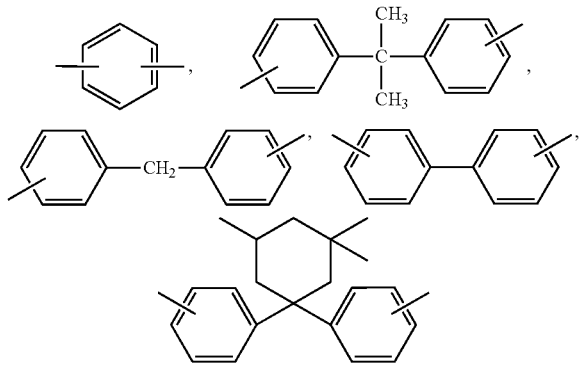

or chlorinated or brominated derivatives thereof. X is derived in particular from resorcinol, hydroquinone, bisphenol A or diphenylphenol. X is particularly preferably derived from bisphenol A.

Mixtures of different phosphates can also be used as component D according to the invention. Phosphorus compounds of formula (IV) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl)phosphate, resorcinol-bridged oligophosphate and bisphenol A-bridged oligophosphate. The use of oligomeric phosphoric acid esters of formula (IV) that are derived from bisphenol A is particularly preferred.

Most preferred as component D is bisphenol A-based oligophosphate according to formula (IVa):

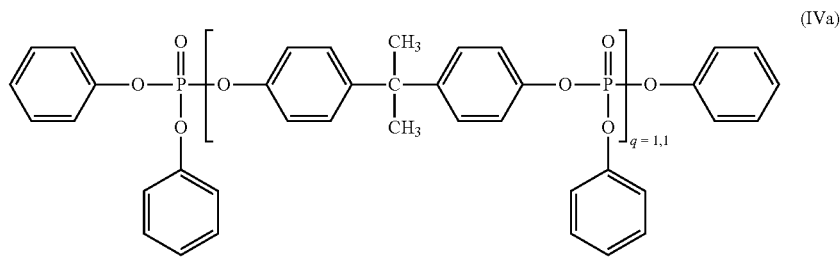

The phosphorus compounds according to component D are known (see e.g. EP-A 0 363 608, EP-A 0 640 655) or can be prepared by known methods in an analogous manner (e.g. Ullmanns Enzyklopädie der technischen Chemie, Vol. 18, p. 301 ff. 1979; Houben-Weyl, Methoden der organischen Chemie, Vol. 12/1, p. 43; Beilstein Vol. 6, p. 177).

If mixtures of different phosphorus compounds are used, as well as in the case of oligomeric phosphorus compounds, the indicated q value is the mean q value. The mean q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonate amines and phosphazenes, as described in WO 00/00541 and WO 01/18105, can also be used as flameproofing agents.

The flameproofing agents can be used on their own or in any desired mixture with one another or in admixture with other flameproofing agents.

The phosphorus-containing flameproofing agents according to component D contain traces of acid (e.g. phosphoric acid, acidic phosphoric acid esters), which can be quantified by acid number (in mg KOH/g of substance) by titration with KOH and are conventionally in the range from 0.01 to 1 mg KOH/g of substance, preferably from 0.02 to 0.5 mg KOH/g of substance and particularly preferably from 0.03 mg KOH to 0.3 mg KOH/g of substance.

Component E

The acidic additives according to component E are preferably selected from at least one of the group of the aliphatic mono- and di-carboxylic acids, the aromatic mono- and di-carboxylic acids, the hydroxy-functionalized dicarboxylic acids, phosphoric acid, acidic phosphoric acid sodium or potassium salts. Preference is given to citric acid, oxalic acid, terephthalic acid or mixtures of the mentioned compounds. Citric acid is particularly preferred.

Component F

The composition can comprise further commercially available additives according to component F, such as flameproofing synergists, rubber-modified graft polymers other than those of component B, antidripping agents (for example compounds of the substance classes of the fluorinated polyolefins, of the silicones and aramid fibres), lubricants and mould release agents (for example pentaerythritol tetrastearate), nucleating agents, stabilizers, antistatics (for example conductive blacks, carbon fibers, carbon nanotubes and also organic antistatics such as polyalkylene ethers, alkyl sulfonates or polyamide-containing polymers), acids, fillers and reinforcing agents (for example glass or carbon fibers, mica, kaolin, talc, $CaCO_3$ and glass flakes) as well as colorings and pigments.

The graft polymers other than those of component B are prepared by radical polymerization, for example by emulsion, suspension, solution or mass polymerization, wherein there is used in the case of emulsion polymerization an emulsifier other than alkali metal or ammonium salts of saturated fatty acids. Preference is given to graft polymers other than those of component B that are prepared by solution or mass polymerization.

Preparation of the Molding Compositions and Molded Bodies

The thermoplastic molding compositions according to the invention can advantageously be prepared by mixing the constituents in question in a known manner and melt compounding and melt extruding at temperatures of from 260° C. to 300° C. in conventional devices such as internal kneaders, extruders and twin-shaft screws.

The individual constituents can be mixed in a known manner either in succession or simultaneously, either at about 20° C. (room temperature) or at a higher temperature.

The invention also provides processes for the preparation of the molding compositions and the use of the molding compositions in the production of molded bodies, and the moldings themselves.

The molding compositions according to the invention can be used, for example, in the production of molded bodies of any kind. These can be produced by injection molding, extrusion and blow molding processes. A further form of processing is the production of molded bodies by deep drawing from previously produced sheets or films.

Examples of such molded bodies include films, profiles, casing parts of any kind, for example for domestic appliances such as televisions, juice extractors, coffee machines, mixers; for office machines such as monitors, flat screens, notebooks, printers, copiers; sheets, pipes, conduits for electrical installations, windows, doors and other profiles for the construction sector (interior fittings and external applications) as well as electrical and electronic parts such as switches, plugs and sockets, as well as bodywork and interior components for commercial vehicles, in particular for the automotive sector.

The molding compositions according to the invention can in particular also be used, for example, in the production of the following molded bodies or moldings: interior fittings for railway vehicles, ships, aircraft, buses and other motor vehicles, casings for electrical devices containing small transformers, casings for devices for processing and transmitting information, casings and cladding for medical devices, massage devices and casings therefor, toy vehicles for children, prefabricated wall panels, casings for security devices and for televisions, heat-insulated transport containers, moldings for sanitary and bathroom fittings, gratings for ventilator openings and casings for gardening tools.

The examples which follow serve to illustrate the invention further.

EXAMPLES

Component A

A.1: Linear polycarbonate based on bisphenol A having a weight-average molecular weight $\overline{M}_w$ of 27,500 g/mol (determined by GPC in $CH_2Cl_2$ at 25° C.).

A.2: Linear polycarbonate based on bisphenol A having a weight-average molecular weight $\overline{M}_w$ of 28,500 g/mol (determined by GPC in $CH_2Cl_2$ at 25° C.).

Component B

Emulsion Graft Polymers of Type B

All parts by weight in the examples of graft polymers below are so standardized that, in each graft polymer indicated hereinbelow, the sum of the parts by weight of the graft base (polybutadiene) and the parts by weight of the graft monomers (styrene and acrylonitrile) is 100 parts by weight. The amounts of water, emulsifiers, initiators and other auxiliary substances are based on this sum of the parts by weight of the graft base and the graft monomers (=100 parts by weight).

General Procedure (I):

1st Step: Preparation of the Rubber Base B2:

The particulate crosslinked rubber base used for the preparation of component B (emulsion graft polymer) was prepared by radical emulsion polymerization of butadiene in the presence of sodium salt of a specific TCD emulsifier as described in DE 3913509A1 (Example 1). The polybutadiene base B2 so obtained has a mean weight-average particle size $d_{50}=350$ nm and is used in the further reaction step in the form of polymer lattices which have a solids content of 25 wt. %.

2nd Step: Preparation of Component B:

60 parts by weight of B2 and from 0 to 3 parts by weight of the particular emulsifier used (see indication below in the particular graft polymer) are heated to 65° C., under nitrogen, and 0.5 part by weight of potassium peroxodisulfate (dissolved in 20 parts by weight of water) and 0.3 part by weight of sodium hydroxide (dissolved in 20 parts by weight of water) are added thereto. A mixture of 30 parts by weight of styrene and 10 parts by weight of acrylonitrile is then metered in in the course of 4 hours, whereby the graft reaction takes place. When the metered addition is complete, the temperature is increased to 80° C. in the course of one hour, and stirring is carried out for a further 3 hours at 80° C. The prepared graft polymer dispersion is then ready for working up (step 3).

3rd Step: Working Up:

The graft polymer dispersion is precipitated at 95° C. in a precipitation solution (consisting either of 2 parts magnesium sulfate and 100 parts water or of 2 parts magnesium sulfate, 1 part acetic acid and 100 parts water), filtered off and optionally (i.e. in the case of a comparison example) washed, and the resulting powder is dried at 70° C. in vacuo to a residual moisture content of <0.5%.

General Procedure (II):

1st Step: Preparation of the Rubber Base B2:

This is carried out as indicated above in step 1 under general procedure (I).

2nd Step: Preparation of Component B:

60 parts by weight of B2 and from 0 to 3 parts by weight of the particular emulsifier used (see indication below in the particular graft polymer) are heated to 65° C., under nitrogen, 0.4 part by weight of tert-butyl hydroperoxide (dissolved in 20 parts by weight of water) and 0.5 part by weight of sodium ascorbate (dissolved in 20 parts by weight of water) are metered in in the course of 4 hours. In parallel therewith, a mixture of 30 parts by weight of styrene and 10 parts by weight of acrylonitrile is metered in in the course of 4 hours, whereby the graft reaction takes place. When the metered addition of styrene and acrylonitrile is complete, 0.1 part by weight of tert-butyl hydroperoxide (dissolved in 5 parts by weight of water) and 0.125 part by weight of sodium ascorbate (dissolved in 5 parts by weight of water) are metered in in the course of one hour, and the temperature is increased to 80° C. in the course of that hour. Stirring is carried out for a further 3 hours at 80° C. The prepared graft polymer dispersion is then ready for working up (step 3).

3rd Step: Working Up:

The graft polymer dispersion is precipitated at 95° C. in a precipitation solution (consisting either of 2 parts magnesium sulfate and 100 parts water or of 2 parts magnesium sulfate, 1 part acetic acid and 100 parts water), filtered off and optionally (i.e. in the case of a comparison example) washed, and the resulting powder is dried at 70° C. in vacuo to a residual moisture content of <0.5%.

Preparation of Graft Polymers B(1) to B(30):

Graft Polymer B(1):

Preparation according to general procedure (I)

2nd step; emulsifier: 2.0 parts by weight of the potassium salt of stearic acid (Sigma-Aldrich).

3rd step:

a) Precipitation: precipitation solution magnesium sulfate/water.

b) Separation: The coagulum obtained after the precipitation is only filtered off (about 20 liters of filtrate solution) and not washed.

Graft Polymer B(2):

Preparation According to General Procedure (I)

2nd step: emulsifier: 2.0 parts by weight of the potassium salt of stearic acid (Sigma-Aldrich).

3rd step;

a) Precipitation; precipitation solution magnesium sulfate/acetic acid/water.

b) Separation: The coagulum obtained after the precipitation is only filtered off (about 20 liters of filtrate solution) and not washed.

Graft Polymer B(3):

Preparation according to general procedure (II)

2nd step: emulsifier 2.0 parts by weight of the potassium salt of stearic acid (Sigma-Aldrich).

3rd step.

a) Precipitation; precipitation solution magnesium sulfate/water.

b) Separation: The coagulum obtained after the precipitation is only filtered off (about 20 liters of filtrate solution) and not washed.

Graft Polymer B(4):

Preparation according to general procedure (II)

2nd step: emulsifier: 2.0 parts by weight of the potassium salt of stearic acid (Sigma-Aldrich).

3rd step: a) Precipitation: coagulation and working up of the coagulum: precipitation solution magnesium sulfate/acetic acid/water.

b) Separation: The coagulum obtained after the precipitation is only filtered off (about 20 liters of filtrate solution) and not washed.

Graft Polymer B(5):

Preparation according to general procedure (II)

2nd step: emulsifier: 1.0 part by weight of the potassium salt of stearic acid (Sigma-Aldrich).

3rd step:

a) Precipitation: precipitation solution magnesium sulfate/acetic acid/water.

b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(6):

Preparation according to general procedure (II)

2nd step: emulsifier 2.0 parts by weight of the potassium salt of stearic acid (Sigma-Aldrich).

3rd step:

a) Precipitation: precipitation solution magnesium sulfate/acetic acid/water.

b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(7):

Preparation according to general procedure (II)

2nd step; emulsifier: 3.0 parts by weight of the potassium salt of stearic acid (Sigma-Aldrich).

3rd step:

a) Precipitation: precipitation solution magnesium sulfate/acetic acid/water.

b) Separation: The coagulum obtained after the precipitation is only filtered off (about 20 liters of filtrate solution) and washed carefully (i.e. suspended 4 times in distilled water and then filtered off and with a large amount of distilled water (about 80 liters per 1 kg of polymer in total)).

Graft Polymer B(8):

Preparation according to general procedure (I)

2nd step: emulsifier 2.0 parts by weight of the potassium salt of stearic acid (Sigma-Aldrich).

3rd step:
 a) Precipitation: precipitation solution magnesium sulfate/water.
 b) Separation: The coagulum obtained after the precipitation is only filtered off (about 20 liters of filtrate solution) and washed once with a large amount of distilled water (i.e. about 20 liters per 1 kg of polymer).

Graft Polymer B(9):
 Preparation according to general procedure (I)
 2nd step: emulsifier: 2.0 parts by weight of the potassium salt of stearic acid (Sigma-Aldrich).
 3rd step:
 a) Precipitation: precipitation solution magnesium sulfate/acetic acid/water.
 b) Separation: The coagulum obtained after the precipitation is only filtered off (about 20 liters of filtrate solution) and washed once with a large amount of distilled water (i.e. about 20 liters per 1 kg of polymer).

Graft Polymer B(10):
 Preparation according to general procedure (I)
 2nd step: emulsifier: 2.0 parts by weight of the potassium salt of stearic acid (Sigma-Aldrich).
 3rd step:
 a) Precipitation: precipitation solution magnesium sulfate/water.
 b) Separation: The coagulum obtained after the precipitation is only filtered off (about 20 liters of filtrate solution) and carefully washed (i.e. suspended 4 times in distilled water and then filtered off and washed with a large amount of distilled water (about 80 liters per 1 kg of polymer in total)).

Graft Polymer B(11):
 Preparation according to general procedure (I)
 2nd step: emulsifier: 2.0 parts by weight of the potassium salt of stearic acid (Sigma-Aldrich).
 3rd step:
 a) Precipitation: precipitation solution magnesium sulfate/acetic acid/water.
 b) Separation: The coagulum obtained after the precipitation is only filtered off (about 20 liters of filtrate solution) and carefully washed (i.e. suspended 4 times in distilled water and then filtered off and washed with a large amount of distilled water (about 80 liters per 1 kg of polymer in total)).

Graft Polymer B(12):
 Preparation according to general procedure (II)
 2nd step: emulsifier 2.0 parts by weight of the potassium salt of stearic acid (Sigma-Aldrich).
 3rd step:
 a) Precipitation: precipitation solution magnesium sulfate/water.
 b) Separation: The coagulum obtained after the precipitation is only filtered off (about 20 liters of filtrate solution) and washed once with a large amount of distilled water (i.e. about 20 liters per 1 kg of polymer).

Graft Polymer B(13):
 Preparation according to general procedure (II)
 2nd step: emulsifier: 2.0 parts by weight of the potassium salt of stearic acid (Sigma-Aldrich).
 3rd step:
 a) Precipitation: precipitation solution magnesium sulfate/acetic acid/water.
 b) Separation: The coagulum obtained after the precipitation is only filtered off (about 20 liters of filtrate solution) and washed once with a large amount of distilled water (i.e. about 20 liters per 1 kg of polymer).

Graft Polymer B(14):
 Preparation according to general procedure (II)
 2nd step: emulsifier: 2.0 parts by weight of the potassium salt of stearic acid (Sigma-Aldrich).
 3rd step:
 a) Precipitation: precipitation solution magnesium sulfate/water. The coagulum obtained after the precipitation is filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(15):
 Preparation according to general procedure (II)
 2nd step: emulsifier 2.0 parts by weight of the potassium salt of stearic acid (Sigma-Aldrich).
 3rd step:
 a) Precipitation: precipitation solution magnesium sulfate/acetic acid/water.
 b) Separation: The coagulum obtained after the precipitation is filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(16) (Comparison):
 Preparation according to general procedure (I)
 2nd step: emulsifier: Graft polymerization was carried out without emulsifier.
 3rd step:
 a) Precipitation: precipitation solution magnesium sulfate/acetic acid/water.
 b) Separation: The coagulum obtained after the precipitation is filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(17) (Comparison):
 Preparation according to general procedure (I)
 2nd step: emulsifier: graft polymerization was carried out with 1 part by weight of the sodium salt of a disproportionated resin acid emulsifier Dresinate 731 (Abieta-Chemie).
 3rd step:
 a) Precipitation: precipitation solution magnesium sulfate/acetic acid/water.
 b) Separation: The coagulum obtained after the precipitation is filtered off (about 20 liters of filtrate solution) and not washed.

Graft Polymer B(18) (Comparison):
 Preparation according to general procedure (II)
 2nd step: emulsifier: graft polymerization was carried out with 1 part by weight of the sodium salt of a disproportionated resin acid emulsifier Dresinate 731 (Abieta-Chemie).
 3rd step:
 a) Precipitation: precipitation solution magnesium sulfate/acetic acid/water.
 b) Separation: The coagulum obtained after the precipitation is filtered off (about 20 liters of filtrate solution) and not washed.

Graft Polymer B(19) (Comparison):
 Preparation according to general procedure (II)
 2nd step: emulsifier: graft polymerization was carried out with 2 parts by weight of the sodium salt of a disproportionated resin acid emulsifier Dresinate 731 (Abieta-Chemie).
 3rd step:
 a) Precipitation: precipitation solution magnesium sulfate/acetic acid/water.

b) Separation: The coagulum obtained after the precipitation is filtered off (about 20 liters of filtrate solution) and not washed.

Graft Polymer B(20) (Comparison):
Preparation according to general procedure (II)
2nd step: emulsifier: 2.0 parts by weight of sodium dodecylsulfate (Sigma-Aldrich).
3rd step:
a) Precipitation: precipitation solution magnesium sulfate/water.
b) Separation: The coagulum obtained after the precipitation is only filtered off (about 20 liters of filtrate solution) and not washed.

Graft Polymer B(21) (Comparison):
Preparation according to general procedure (II)
2nd step: emulsifier 2.0 parts by weight of sodium dodecylsulfate (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and not washed.

Graft Polymer B(22) (Comparison):
Preparation according to general procedure (II)
2nd step: emulsifier: 2.0 parts by weight of sodium dodecylsulfate (Sigma-Aldrich).
3rd step:
a) Precipitation: precipitation solution magnesium sulfate/water.
b) Separation: The coagulum obtained after the precipitation is only filtered off (about 20 liters of filtrate solution) and washed once with a large amount of distilled water (i.e. about 20 liters per 1 kg of polymer).

Graft Polymer B(23) (Comparison):
Preparation according to general procedure (II)
2nd step: emulsifier 2.0 parts by weight of sodium dodecylsulfate (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and washed once with a large amount of distilled water (i.e. about 20 liters per 1 kg of polymer).

Graft Polymer B(24) (Comparison):
Preparation according to general procedure (II)
2nd step: emulsifier: 2.0 parts by weight of sodium dodecylsulfate (Sigma-Aldrich).
3rd step:
a) Precipitation: precipitation solution magnesium sulfate/water.
b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(25) (Comparison):
Preparation according to general procedure (II)
2nd step: emulsifier 2.0 parts by weight of sodium dodecylsulfate (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(26) (Comparison):
Preparation according to general procedure (I)
2nd step; emulsifier: 1.5 parts by weight of sodium dodecylsulfate (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(27) (Comparison):
Preparation according to general procedure (II)
2nd step: emulsifier: 1.5 parts by weight of Dowfax 2A1 (sodium salt(s) of a sulfonated diphenyl ether derivative) (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(28) (Comparison):
Preparation according to general procedure (I)
2nd step: emulsifier: 2.0 parts by weight of Dowfax 2A1 (sodium salt(s) of a sulfonated diphenyl ether derivative) (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution) and washed carefully (i.e. suspended 4 times in distilled water and then filtered off and with a large amount of distilled water (about 80 liters per 1 kg of polymer in total)).

Graft Polymer B(29) (Comparison):
Preparation according to general procedure (II)
2nd step: emulsifier: 1.0 part by weight of Dowfax 3B2 (sodium salt(s) of a sulfonated diphenyl ether derivative) (Sigma-Aldrich)
3rd step:
a) Precipitation: precipitation solution magnesium sulfate/acetic acid/water.
b) Separation: The coagulum obtained after the precipitation is only filtered off (about 20 liters of filtrate solution) and washed carefully (i.e. suspended 4 times in distilled water and then filtered off and washed with a large amount of distilled water (about 80 liters per 1 kg of polymer in total)).

Graft Polymer B(30) (Comparison):
Preparation according to general procedure (II)
2nd step; emulsifier: 1.0 part by weight of sodium dodecylsulfate (Sigma-Aldrich).
3rd step:
a) Precipitation: precipitation solution magnesium sulfate/acetic acid/water.
b) Separation: The coagulum obtained after the precipitation is only filtered off (about 20 liters of filtrate solution)

and washed carefully (i.e. suspended 4 times in distilled water and then filtered off and washed with a large amount of distilled water (about 80 liters per 1 kg of polymer in total)).

Component C.1

Copolymer of 75 wt. % styrene and 25 wt. % acrylonitrile having a weight-average molecular weight $M_w$ of 130 kg/mol (determined by GPC), prepared by the mass polymerization process Component D.1

Bisphenol A diphenyl diphosphate, Reofos BAPP, Great Lakes (contains traces of acid within the scope of component E. Acid number: 0.06 mg KOH/g of substance)

Component E

E.1 citric acid (anhydrous), DSM

Component F

F.1 pentaerythritol tetrastearate as lubricant/mould release agent
F.2 phosphite stabilizer, Irganox® B 900, Ciba Speciality Chemicals
F.3 magnesium stearate as lubricant/mould release agent, Sigma-Aldrich
F.4 poly(perfluoroethylene) PTFE, Polyflon FA-500, Daikin
F.5 boehmite, Pural 200, Sasol
F.6 Santac® AT 08 from Nippon A&L (an ABS prepared by the mass polymerization process)
F.7 Magnum® 3904 from Dow Chemicals (an ABS prepared by the mass polymerization process)

Preparation and Testing of the Molding Compositions

The compositions listed in Tables 1 to 3 are prepared in a 1.5 liter internal kneader.

TABLE 1

PC/ABS composition without flameproofing agent

| Component | Parts by weight |
|---|---|
| A.1 | 58 |
| B | 18 |
| C.1 | 24 |
| F.1 | 0.75 |
| F.2 | 0.1 |
| E.1 (optional) | 0 or 0.1 |
| F.3 (optional) | 0 or 0.4 |

TABLE 2

PC/ABS composition without flameproofing agent (comparison)

| Component | Parts by weight |
|---|---|
| A.1 | 60 |
| F.7 | 40 |
| F.1 | 0.5 |
| F.2 | 0.1 |

TABLE 3 flameproof PC/ABS composition

| Component | Parts by weight |
|---|---|
| A.2 | 70.5 |
| B | 4.0 |
| D.1 (also within the scope of component E) | 13.0 |
| F.1 | 0.3 |
| F.2 | 0.1 |
| F.3 (optional) | 0 or 0.4 |
| F.4 | 0.5 |
| F.5 | 0.8 |
| F.6 | 10.8 |

The inherent color/natural color is evaluated by determining the yellowness index (YI) on color sample sheets of dimensions 60×40×2 mm in accordance with ASTM standard E-313-96 (light type: C, observer: 2°, measurement opening: large area value) by the equation YI=(128X−106Z)/Y, where X,Y,Z=color coordinates according to DIN 5033.

As a measure of the hydrolytic stability of the compositions so prepared there is used the change in the MVR measured in accordance with ISO 1133 at 260° C. (at 240° C. for PC/ABS compositions with flameproofing agent) with a load of 5 kg on 7-day storage of the granules at 95° C. and 100% relative humidity ("FWL storage"). The increase in the MVR value as compared with the MVR value before the corresponding storage is calculated as ΔMVR(hydr.), which is defined by the formula below.

$$\Delta MVR(hyrdr) = \frac{MVR(\text{after } FWL \text{ storage} - MVR \text{ (before storage)}}{MVR \text{ (before storage)}} \cdot 100\%$$

As a measure of the processing stability of the compositions so prepared there is used the change (in percent) in the MVR measured in accordance with ISO 1133 at 260° C. for non-flameproofed PC/ABS compositions and at 240° C. for flameproofed PC/ABS compositions, with a load of 5 kg and a 15-minute dwell time of the melt, with the exclusion of air, at a temperature of 300° C. The resulting parameter ΔMVR (proc.) is calculated by the formula below.

$$\Delta MVR(proc.) = \frac{MVR(\text{after storage of the melt}) - MVR(\text{before storage})}{MVR(\text{before storage})} \cdot 100\%$$

The results of the storage in a moist climate (hydrolytic stability) and at 300° C. (processing stability) are summarised in Tables 4 and 5 (the polycarbonate compositions according to Table 1 and according to Table 2 were used, i.e. without flameproofing agent):

All the compositions 2, 3 and 5 to 17 according to the invention, without exception, exhibit a good inherent color with yellowness indices <30, which were measured on the molded bodies injection molded at 260° C. If these compositions 2, 3 and 5 to 17 are compared with composition 18, in which component B16 was prepared in the absence of an emulsifier, the positive effect of the fatty acid emulsifier (potassium stearate) on the inherent color of the polycarbonate compositions is clear—the yellowness index measured for composition 18 is significantly higher at 33 (injection molding at 260/80° C.). If the yellowness indices of compositions 2, 3, 5 to 17 are compared with those of comparison compositions 19 to 22 (YI>30, injection molding at 260°/80° C.), component B of which was prepared with an emulsifier based on resin acid, the compositions according to the invention exhibit a better natural color in this case too. This means that the choice of emulsifiers based on saturated fatty acids from the general class carboxylate-containing emulsifiers, which also includes the resin acid derivatives, is critical for achieving a good inherent color in the polycarbonate compositions that contain an emulsion graft polymer as impact-modifying component. Only for composition 23 is a yellowness index of 28 observed, which can be explained by the addition of magnesium stearate, although this is accompanied by a dramatic impairment of the hydrolytic stability and the melt or processing stability.

If compositions 2, 3, 5 to 17 are compared with compositions 24 to 36 known from the prior art, which according to EP-A 0 900 827 are substantially free of basic impurities and do not degrade polycarbonate, it is found that yellowness indices markedly greater than 30, with values of up to 56, are observed (injection molding at 260°/80° C.) in all the comparison compositions and that the hydrolytic and melt viscosity of the compositions from comparison examples are only at a good level when the emulsion graft component B was washed in the working-up step. Compositions 2, 3 and 5 to 17 according to the invention exhibit a markedly better inherent color than compositions 24 to 36 in all cases, comparably good hydrolytic stability and markedly better melt or processing stability in several cases.

The inherent color of the compositions according to the invention exhibits only a slight impairment even at high processing temperatures of 300° C., which are not unusual for polycarbonate molding compositions; for example, an increase for composition 3 from YI=26 (injection molding at 260°/80° C.) to YI=32 and in another example for composition 6 an increase from YI=22 to YI=24.

Only polycarbonate compositions 37 and 38 (Table 5), which contain only pure mass graft polymers as impact-modifying component, exhibit a very light inherent color (8>yellowness index>4) both at 260° C. and at 300° C. while at the same time having excellent hydrolytic stabilities, distinguished by an increase in the MVR of from 6 to 10%. However, these compositions exhibit poorer melt or processing stability, which in several cases is markedly inferior to that of the compositions according to the invention.

Compositions 1 and 4 show that it is necessary either to work up the emulsion graft polymers of component B under acidic conditions (pH<7) or to use acid-containing additives in the preparation of the polycarbonate molding compositions by melt compounding. For example, although compositions 2 and 4 exhibit a good inherent color with yellowness indices <30 when injection molded at 260° C., they turn markedly brown at higher temperatures, so that YI of over 60 are determined when they are injection molded at 300° C. The hydrolytic stability and melt stability of compositions 2 and 4 are also significantly poorer than those of the compositions according to the invention, in which acidic working up of the graft emulsion took place or acidic additives were added to the molding compositions.

If magnesium salts are used in the working up of the ABS emulsions according to component B, these magnesium salts bind to the carboxylate-containing emulsifiers; In the examples of this application, potassium stearate was used as emulsifier, so that magnesium stearate was formed during the precipitation. On the other hand, magnesium salts of saturated fatty acids are often used as lubricants in plastics processing. In comparison compositions 22 and 23, 0.4 part by weight of magnesium stearate was used in the melt compounding, which corresponds to an amount of magnesium stearate which is formed on coagulation of the graft-polymer dispersions of Examples B(1) to B(15). In composition 23, an acid was additionally used, which was to neutralize the basic constituents. The results show that composition 22 differs from all the compositions 2, 3, 5 to 17 according to the invention both by a poorer natural color and by extraordinarily poor hydrolytic stability and melt and processing stability. The neutralizing action of the acid used is shown in the case of comparison composition 23—the inherent color of this composition is not adversely affected and remains very light, at 28≤YI≤30, on injection molding both at 260° C. and at 300° C. The hydrolytic stability and melt or processing stability are very poor, however. This clearly shows the difference that the compositions according to the invention, which contain emulsifiers based on saturated fatty acids, exhibit both a good inherent color and good hydrolytic stability and melt or processing stability, while the compositions in which magnesium salts of the saturated fatty acids were used as additive exhibit extraordinarily poor hydrolytic and melt or processing stability and, in some cases, a poor inherent color.

Table 6 summarizes the properties of the PC/ABS compositions containing flameproofing additives. In the example compositions, only a partial amount of emulsion graft polymer was used as component B in addition to a mass ABS F.6. The flameproofing additive D.1 contains acid groups (acid number of 0.06 mg/g of substance), so that the addition of additional acidic additives is not necessary. These examples also show that compositions 39 to 42 according to the invention have a good inherent color while at the same time having good hydrolytic stability and excellent melt or processing stability. Comparison composition 43, which contains a resin acid emulsifier in component B, exhibits a significantly poorer natural color at 300° C., with a yellowness index of 31, for a small amount of emulsion graft polymer. Magnesium stearate was added to comparison composition 44, with the result that its inherent color was improved but its hydrolytic stability was markedly impaired. The melt and processing stability remained at an excellent level.

All these examples show that the object underlying this invention, of providing novel polycarbonate molding compositions containing at least one emulsion graft polymer as impact modifier, which compositions are distinguished by a combination of a light natural color, high hydrolytic stability and excellent processing stability and which additionally fulfil the condition that these impact-modified polycarbonate molding compositions contain an emulsion graft polymer that is prepared in a preparation process that is efficient and advantageous for the environment, has been achieved.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties. The use of singular article terms including "an", "a" and "the" can connote the singular or plural of the object that follows.

TABLE 4

Properties of the PC/ABS compositions according to Table 1

| | ABS | Emulsifier | Amount of emulsifier [ppw] | Precipitation solution | Washing | Citric acid | Magnesium stearate | ΔMVR (hydr.) [%] | ΔMVR (proc.) [%] | Yellowness Index 260° C. | Yellowness Index 300° C. |
|---|---|---|---|---|---|---|---|---|---|---|---|
| 1 (comp.) | B(1) | Potassium stearate | 2.0 | MgSO₄/H₂O | no | | | 238 | 350 | 29 | 71 |
| 2 | B(1) | Potassium stearate | 2.0 | MgSO₄/H₂O | no | yes | | 186 | 105 | 28 | — |
| 3 | B(2) | Potassium stearate | 2.0 | MgSO₄/CH₃COOH/H₂O | no | yes | | 255 | 94 | 26 | 32 |
| 4 (comp.) | B(3) | Potassium stearate | 2.0 | MgSO₄/H₂O | no | | | n.d.¹⁾ | n.d.¹⁾ | 25 | 65 |
| 5 | B(3) | Potassium stearate | 2.0 | MgSO₄/H₂O | no | yes | | 205 | 45 | 20 | — |
| 6 | B(4) | Potassium stearate | 2.0 | MgSO₄/CH₃COOH/H₂O | no | | | 140 | 10 | 22 | 24 |
| 7 | B(5) | Potassium stearate | 1.0 | MgSO₄/CH₃COOH/H₂O | careful | yes | | 147 | 24 | 27 | — |
| 8 | B(6) | Potassium stearate | 2.0 | MgSO₄/CH₃COOH/H₂O | careful | yes | | 211 | 44 | 16 | — |
| 9 | B(7) | Potassium stearate | 3.0 | MgSO₄/CH₃COOH/H₂O | careful | yes | | 259 | 29 | 18 | — |
| 10 | B(8) | Potassium stearate | 2.0 | MgSO₄/H₂O | once | yes | | 187 | 127 | 23 | — |
| 11 | B(9) | Potassium stearate | 2.0 | MgSO₄/CH₃COOH/H₂O | once | yes | | 233 | 158 | 29 | — |
| 12 | B(10) | Potassium stearate | 2.0 | MgSO₄/H₂O | careful | yes | | 183 | 113 | 23 | — |
| 13 | B(11) | Potassium stearate | 2.0 | MgSO₄/CH₃COOH/H₂O | careful | yes | | 205 | 105 | 28 | — |
| 14 | B(12) | Potassium stearate | 2.0 | MgSO₄/H₂O | once | yes | | 198 | 53 | 19 | — |
| 15 | B(13) | Potassium stearate | 2.0 | MgSO₄/CH₃COOH/H₂O | once | yes | | 181 | 15 | 23 | — |
| 16 | B(14) | Potassium stearate | 2.0 | MgSO₄/H₂O | careful | yes | | 220 | 55 | 18 | — |
| 17 | B(15) | Potassium stearate | 2.0 | MgSO₄/CH₃COOH/H₂O | careful | yes | | 200 | 25 | 24 | — |
| 18 (comp.) | B(16) | none | | MgSO₄/CH₃COOH/H₂O | careful | yes | | 63 | 64 | 33 | 37 |
| 19 (comp.) | B(17) | Na Dresinate 731 | 1.0 | MgSO₄/CH₃COOH/H₂O | no | yes | | 80 | 132 | 32 | 35 |
| 20 (comp.) | B(18) | Na Dresinate 731 | 1.0 | MgSO₄/CH₃COOH/H₂O | no | yes | | 91 | 51 | 32 | — |
| 21 (comp.) | B(19) | Na Dresinate 731 | 2.0 | MgSO₄/CH₃COOH/H₂O | no | yes | | 132 | 74 | 34 | 38 |
| 22 (comp.) | B(19) | Na Dresinate 731 | 2.0 | MgSO₄/CH₃COOH/H₂O | no | | yes | n.d.¹⁾ | n.d.¹⁾ | 44 | 87 |
| 23 (comp.) | B(19) | Na Dresinate 731 | 2.0 | MgSO₄/CH₃COOH/H₂O | no | yes | yes | 470 | 300 | 28 | 30 |
| 24 (comp.) | B(20) | Na dodecylsulfate | 2.0 | MgSO₄/H₂O | no | yes | | 186 | 64 | 51 | — |
| 25 (comp.) | B(21) | Na dodecylsulfate | 2.0 | MgSO₄/CH₃COOH/H₂O | no | yes | | 166 | 80 | 48 | — |
| 26 (comp.) | B(22) | Na dodecylsulfate | 2.0 | MgSO₄/H₂O | once | yes | | 173 | 64 | 52 | — |
| 27 (comp.) | B(23) | Na dodecylsulfate | 2.0 | MgSO₄/CH₃COOH/H₂O | once | yes | | 243 | 73 | 55 | — |
| 28 (comp.) | B(24) | Na dodecylsulfate | 2.0 | MgSO₄/H₂O | careful | yes | | 50 | 50 | 46 | — |
| 29 (comp.) | B(25) | Na dodecylsulfate | 2.0 | MgSO₄/CH₃COOH/H₂O | careful | yes | | 87 | 52 | 44 | — |
| 30 (comp.) | B(26) | Na dodecylsulfate | 1.5 | MgSO₄/CH₃COOH/H₂O | careful | yes | | 83 | 45 | 50 | — |
| 31 (comp.) | B(27) | Dowfax 2A1 | 1.5 | MgSO₄/CH₃COOH/H₂O | careful | yes | | 140 | 71 | 55 | — |
| 32 (comp.) | B(28) | Dowfax 2A1 | 2.0 | MgSO₄/CH₃COOH/H₂O | careful | yes | | 208 | 65 | 56 | — |
| 33 (comp.) | B(29) | Dowfax 3B2 | 1.0 | MgSO₄/CH₃COOH/H₂O | careful | yes | | 110 | 90 | 39 | — |
| 34 (comp.) | B(29) | Dowfax 3B2 | 1.0 | MgSO₄/CH₃COOH/H₂O | careful | | | 65 | 57 | 32 | — |
| 35 (comp.) | B(30) | Na dodecylsulfate | 1.0 | MgSO₄/CH₃COOH/H₂O | careful | yes | | 90 | 62 | 43 | — |
| 36 (comp.) | B(30) | Na dodecylsulfate | 1.0 | MgSO₄/CH₃COOH/H₂O | careful | | | 70 | 58 | 37 | — |

¹⁾cannot be determined because polycarbonate degradation already occurs during the thermal stress on compounding and leads to melt viscosities of the starting products that are clearly too low.

TABLE 5

Properties of the PC/ABS compositions according to Table 2

| Composition | ABS Mass ABS | Emulsifier | ΔMVR (hydr.) [%] | ΔMVR (proc.) [%] | Yellowness Index 260° C. | 300° C. |
|---|---|---|---|---|---|---|
| 37 (comp.) | F.6 | none | 6 | 115 | 4 | 8 |
| 38 (comp.) | F.7 | none | 10 | 141 | 5 | 8 |

TABLE 6

Properties of the flameproofed PC/ABS composition according to Table 3

| | ABS | Emulsifier | Amount of emulsifier [ppw] | Precipitation solution | Washing | Acid (from flame-proofing agent) | Magnesium stearate | ΔMVR (hydr.) [%] | ΔMVR (proc.) [%] | Yellowness Index 260° C. | 300° C. |
|---|---|---|---|---|---|---|---|---|---|---|---|
| 39 | B(1) | Potassium stearate | 2.0 | MgSO$_4$/H$_2$O | no | yes | | 119 | 15 | 22 | 22 |
| 40 | B(2) | Potassium stearate | 2.0 | MgSO$_4$/CH$_3$COOH/H$_2$O | no | yes | | 190 | 25 | 25 | 25 |
| 41 | B(3) | Potassium stearate | 2.0 | MgSO$_4$/H$_2$O | no | yes | | 120 | 19 | 22 | 20 |
| 42 | B(4) | Potassium stearate | 2.0 | MgSO$_4$/CH$_3$COOH/H$_2$O | no | yes | | 110 | 9 | 25 | 26 |
| 43 (comp.) | B(19) | Na Dresinate 731 | 2.0 | MgSO$_4$/CH$_3$COOH/H$_2$O | no | yes | | 142 | 12 | 25 | 31 |
| 44 (comp.) | B(19) | Na Dresinate 731 | 2.0 | MgSO$_4$/CH$_3$COOH/H$_2$O | no | yes | yes | 215 | 0 | 23 | 25 |

The invention claimed is:

1. A composition comprising
A) from 10 to 99 parts by weight, in each case based on the entirety of components A+B+C, of aromatic polycarbonate and/or aromatic polyester carbonate,
B) from 1 to 35 parts by weight, in each case based on the entirety of components A+B+C, of rubber-modified graft polymer of
  B.1 from 5 to 95 wt. % of at least one vinyl monomer on
  B.2 from 95 to 5 wt. % of one or more graft bases having a glass transition temperature <10° C.,
  wherein the rubber-modified graft polymer component B) comprises 0.1 to 5 parts by weight of an emulsifier comprising potassium stearate (C$_{17}$H$_{35}$COOK), or sodium stearate (C$_{17}$H$_{35}$COONa), or a combination thereof, based on the total weight of the at least one vinyl monomer B.1 and the graft base B.2,
C) from 0 to 40 parts by weight, in each case based on the entirety of components A+B+C, of resinous, thermoplastic and rubber-free vinyl (co)polymer and/or polyalkylene terephthalate,
D) from 0 to 50 parts by weight, in each case based on the entirety of components A+B+C, of phosphorus-containing flame retardant,
E) from 0 to 1.0 part by weight, in each case based on the entirety of components A+B+C, of acidic additives and
F) from 0 to 50 parts by weight, in each case based on the entirety of components A+B+C, of additional substances,
wherein component B is obtained by reacting component B.1 with the graft base B.2 by emulsion polymerisation, with the proviso that, in the case of compositions that are free of components D) and E), the pH of the graft polymer dispersion during a precipitation step is less than 7, and the graft polymer is precipitated from the dispersion by addition of magnesium sulphate, where the emulsifier or emulsifiers and magnesium sulphate remain in component B.

2. A composition according to claim 1, wherein the graft reaction uses from 0.3 to 2.5 parts by weight (based on the entirety of the parts by weight of the monomers B.1 used and of the graft base B.2=100 parts by weight) of the emulsifier.

3. A composition according to claim 1, wherein the graft reaction uses from 1.5 to 2.5 parts by weight (based on the entirety of the parts by weight of the monomers B.1 used and of the graft base B.2=100 parts by weight) of the emulsifier.

4. A process for the preparation of an impact-modified polycarbonate moulding compositions, where the composition comprises
A) from 10 to 99 parts by weight of aromatic polycarbonate and/or aromatic polyester carbonate,
B) from 1 to 35 parts by weight of rubber-modified graft polymer of
  B.1 from 5 to 95 wt. % of at least one vinyl monomer on
  B.2 from 95 to 5 wt. % of one or more graft bases having a glass transition temperature <10° C.,
  wherein the rubber-modified graft polymer component B) comprises 0.1 to 5 parts by weight of an emulsifier comprising potassium stearate (C$_{17}$H$_{35}$COOK), or sodium stearate (C$_{17}$H$_{35}$COONa), or a combination thereof, based on the total weight of the at least one vinyl monomer B.1 and the graft base B.2,
C) from 0 to 40 parts by weight of resinous, thermoplastic and rubber-free vinyl (co)polymer and/or polyalkylene terephthalate,
D) from 0 to 50 parts by weight, in each case based on the entirety of components A+B+C, of phosphorus-containing flame retardant,
E) from 0 to 1.0 part by weight, in each case based on the entirety of components A+B+C, of acidic additives, and
F) from 0 to 50 parts by weight, in each case based on the entirety of components A+B+C, of additional substances,
wherein the process comprises mixing components A)-F) either in succession or simultaneously, at a temperature of 20° C. or higher and, compounding components A)-F) in the melt and extruding components A)-F) in the melt, at temperatures of from 260° C. to 300° C.,
wherein the impact modifier comprises rubber-modified graft polymer (component B) which is prepared by reacting component B.1 with the graft base B.2 by emulsion polymerisation, where (i) in a first step, the rubber base B.2 is prepared directly in the form of an aqueous dispersion by free-radical emulsion polymerisation or is dispersed in the water, (ii) in a second step, the reaction of component B.1 with the graft base B.2 (referred to hereinbelow as "graft reaction") is carried out by emulsion polymerisation, where 1) component B.2 dispersed in water,
2) from 0.1 to 5 parts by weight (based on the entirety of the parts by weight of the monomers B.1 used in the preparation of the graft polymer B and of the graft base B.2=100 parts by weight) of the emulsifier is used, and the monomers according to component B.1 and free-radical generators and optionally molecular weight regulators are added to the rubber base dispersion obtained in step (1),
3) work-up is carried out by
   3.1) precipitation with magnesium sulphate and
   3.2) separation of the dispersing water,
with the proviso that, in the case of compositions that are free of components D) and E), the pH of the graft polymer dispersion during the precipitation step (3.1) is less than 7, wherein the resulting moist graft polymer is not washed with additional water, and wherein the emulsifier or emulsifiers and magnesium sulphate remain in component B.

5. A process according to claim 4, wherein the graft reaction uses from 0.2 to 2.5 parts by weight (based on the entirety of the parts by weight of the monomers B.1 used and of the graft base B.2=100 parts by weight) of the emulsifier.

6. A process according to claim 4, wherein the graft reaction uses from 1.5 to 2.5 parts by weight (based on the entirety of the parts by weight of the monomers B.1 used and of the graft base B.2=100 parts by weight) of the emulsifier.

7. A moulding or semi-finished product obtained by the process according to claim 4.

8. A moulding or semi-finished produced prepared from a composition according to claim 1.

9. A composition according to claim 1, comprising 0.01 to 1.0 part by weight, in each case based on the entirety of components A+B+C, of acidic additives (E).

10. A composition according to claim 1, comprising 0.02 to 0.5 part by weight, in each case based on the entirety of components A+B+C, of acidic additives (E).

11. A process according to claim 4, wherein the composition comprises 0.01 to 1.0 part by weight, in each case based on the entirety of components A+B+C, of acidic additives (E).

12. A process according to claim 4, wherein the composition comprises 0.02 to 0.5 part by weight, in each case based on the entirety of components A+B+C, of acidic additives (E).

13. A composition according to claim 1, wherein the emulsifier used in the graft reaction is potassium stearate.

14. A process according to claim 4, wherein the emulsifier used in the graft reaction is potassium stearate.

15. A composition according to claim 1, wherein the emulsifier used in the graft reaction is sodium stearate.

16. A process according to claim 4, wherein the emulsifier used in the graft reaction is sodium stearate.

17. A composition according to claim 1, comprising 1 to 30 part by weight, in each case based on the entirety of components A+B+C, of component C).

18. A composition according to claim 1, comprising 1 to 40 parts by weight, in each case based on the entirety of components A+B+C, of component D).

19. A composition according to claim 1, comprising 0.5 to 25 parts by weight, in each case based on the entirety of components A+B+C, of component F).

* * * * *